(12) United States Patent
Yang et al.

(10) Patent No.: US 12,311,932 B2
(45) Date of Patent: May 27, 2025

(54) AUTONOMOUS DRIVING CONTROL APPARATUS AND METHOD THEREOF

(71) Applicants: Hyundai Motor Company, Seoul (KR); Kia Corporation, Seoul (KR)

(72) Inventors: Seok Youl Yang, Incheon (KR); Hee Kyung Kim, Seoul (KR); Sung Min Park, Seoul (KR); Rosali Sun Pyun, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 254 days.

(21) Appl. No.: 17/968,669

(22) Filed: Oct. 18, 2022

(65) Prior Publication Data

US 2023/0286501 A1  Sep. 14, 2023

(30) Foreign Application Priority Data

Mar. 11, 2022 (KR) ........................ 10-2022-0030975

(51) Int. Cl.
*B60W 30/14* (2006.01)
*B60W 40/105* (2012.01)
(Continued)

(52) U.S. Cl.
CPC ........ *B60W 30/143* (2013.01); *B60W 40/105* (2013.01); *B60W 50/14* (2013.01);
(Continued)

(58) Field of Classification Search
CPC .. B60W 30/143; B60W 40/105; B60W 50/14; B60W 60/0015; B60W 60/0053;
(Continued)

(56) References Cited

U.S. PATENT DOCUMENTS

2015/0314780 A1* 11/2015 Stenneth ............. G05D 1/0061
  701/1
2016/0282874 A1 9/2016 Kurata et al.
(Continued)

FOREIGN PATENT DOCUMENTS

JP         2014-220890 A   11/2014
KR   10-2019-0074024 A    6/2019
(Continued)

*Primary Examiner* — Brian P Sweeney
(74) *Attorney, Agent, or Firm* — MORGAN, LEWIS & BOCKIUS LLP (57) ABSTRACT

An apparatus of controlling autonomous driving in a transition demand (TD) process during the autonomous driving and a method thereof are provided. A controller is configured to determine whether there is a section where it is impossible to operate autonomous driving in front of an autonomous driving route of an autonomous vehicle, during autonomous driving of the autonomous vehicle, determines a maximum speed limit while a TD is output, based on a current speed of the autonomous vehicle, outputs the TD before a predetermined distance from the section where it is impossible to operate the autonomous driving, and is configured to control a speed of the autonomous vehicle based on the maximum speed limit. The apparatus enhances a problem in which a TD is initiated from a too long distance to the section where it is impossible to operate the autonomous driving.

18 Claims, 7 Drawing Sheets

(51) Int. Cl.
  *B60W 50/14*     (2020.01)
  *B60W 60/00*     (2020.01)
(52) U.S. Cl.
  CPC .... *B60W 60/0015* (2020.02); *B60W 60/0053* (2020.02); *B60W 60/0059* (2020.02); *B60W 2050/146* (2013.01); *B60W 2555/60* (2020.02); *B60W 2556/40* (2020.02)
(58) Field of Classification Search
  CPC ....... B60W 60/0059; B60W 2050/146; B60W 2555/60; B60W 2556/40; B60W 2050/143; B60W 2556/50; B60W 2720/10; B60W 60/001; B60W 60/0011; B60W 60/0013; B60W 60/005; B60W 60/0016; B60W 30/08; B60W 30/146; B60W 40/02; B60W 2520/10; B60W 2556/45
  See application file for complete search history.

(56)          References Cited

U.S. PATENT DOCUMENTS

| | | |
|---|---|---|
| 2019/0235516 A1 | 8/2019 | Zhang et al. |
| 2020/0031340 A1 | 1/2020 | Tao et al. |
| 2022/0097697 A1 | 3/2022 | Wang |
| 2023/0115708 A1* | 4/2023 | Xiang ............... G08G 1/16 701/23 |

FOREIGN PATENT DOCUMENTS

| | | | | |
|---|---|---|---|---|
| KR | 20190074024 A | * | 6/2019 | ............ B60W 30/14 |
| KR | 10-2021-0041545 A | | 4/2021 | |
| KR | 10-2021-0084722 A | | 7/2021 | |

\* cited by examiner

| Automation Level | SAE Classification Criteria | System Role | Driver Role |
|---|---|---|---|
| LEVEL 0 | No Automation | Provide only temporary emergency intervention or warning | The driver does all the driving. |
| LEVEL 1 | Driver Assistance | Perform some driving functions such as steering and acceleration/deceleration together under the riding of the driver who is performing the driving function in the normal operating section | The driver determines whether/when the level 1 system operates and does the rest of the driving except for steering wheel or accelerator/decelerator pedal control (including driving environment/vehicle operation/level 1 system monitoring and immediate emergency preparedness). |
| LEVEL 2 | Partial Automation | Perform driving functions such as steering and acceleration/deceleration under the riding of the driver who is monitoring the steering and acceleration/deceleration devices on behalf of the driver | The driver determines whether/when the system operates and does the rest of the driving except for steering wheel or accelerator/decelerator pedal control (including driving environment/vehicle operation/level 2 system monitoring and immediate emergency preparedness). |
| LEVEL 3 | Conditional Automation | Hand over driving control authority to the driver and perform driving functions such as steering and acceleration/deceleration, in situations other than the conditions | The driver determines whether/when the system operates and does the rest of the driving except for steering wheel or accelerator/decelerator pedal control and driving environment monitoring (should take over the control authority of the level 3 system and perform emergency preparedness, when requesting to hand over the control authority of the level 3 system). |
| LEVEL 4 | High Automation | In extremely exceptional circumstances, the system performs all driving functions under the riding of the driver. | It is able to selectively perform emergency preparedness, when requesting to hand over the control authority of the level 4 system. |
| LEVEL 5 | Full Automation | Perform the fully driving function capable of responding to any situation without the driver | The driver only determines whether the system operates and does not perform all the driving. |

AUTONOMOUS DRIVING CONTROL APPARATUS AND METHOD THEREOF

CROSS-REFERENCE TO RELATED APPLICATION

The present application claims priority to Korean Patent Application No. 10-2022-0030975, filed on Mar. 11, 2022, the entire contents of which is incorporated herein for all purposes by this reference.

BACKGROUND OF THE PRESENT DISCLOSURE

Field of the Present Disclosure

The present disclosure relates to an autonomous driving control apparatus and a method thereof, and more particularly, relates to an apparatus of controlling autonomous driving in a transition demand (TD) process during the autonomous driving and a method thereof.

Description of Related Art

An autonomous vehicle needs a capability of adaptively coping with a surrounding situation which changes in real time while driving. First of all, a reliable determination control function is required to mass produce and enable autonomous vehicles. A semi-autonomous vehicle recently on the market performs driving, braking, and steering on behalf of a driver to reduce fatigue of the driver. Unlike fully autonomous driving, semi-autonomous driving should allow the driver to keep focusing on the driving, for example, should allow the driver to continue holding the steering wheel. Recently, the semi-autonomous vehicle is loaded with a highway driving assist (HDA) function, a driver status warning (DSW) function of determining driver carelessness, such as drowsy driving or gaze departure, and state abnormality and outputting a warning alarm through a cluster or the like, a driver awareness warning (DAW) function of determining whether the vehicle crosses the line and performs unstable driving by a front view camera, a forward collision-avoidance assist (FCA) or active emergency brake system (AEBS) function of performing emergency braking when detecting a head on collision, or the like to be sold.

When there is a section where it is impossible to operate autonomous driving in front of a driving route, an existing autonomous driving system outputs a transition demand (TD) to a driver in advance to guide the driver to take over control authority of the autonomous vehicle. However, when a TD is output from a too long distance to the section where it is impossible to operate the autonomous driving, because the satisfaction of a user who utilizes an autonomous driving function is reduced, there is a need to develop a technology for a TD, which enhances it.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of controlling autonomous driving in a transition demand (TD) process during the autonomous driving and a method thereof.

Another aspect of the present disclosure provides an autonomous driving control apparatus of enhancing a problem in which a TD is initiated from a too long distance to a section where it is impossible to operate autonomous driving and a method thereof.

Another aspect of the present disclosure provides an autonomous driving control apparatus of enhancing satisfaction of a user who utilizes an autonomous driving function in a TD process and a method thereof.

Another aspect of the present disclosure provides an autonomous driving control apparatus of stability of an autonomous driving function in a TD process and a method thereof.

Another aspect of the present disclosure provides an autonomous driving control apparatus of performing a TD with regard to a surrounding situation in a TD process and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous driving control apparatus may include a controller configured for determining whether there is a section where it is impossible to operate autonomous driving in front of an autonomous driving route of an autonomous vehicle, determines a maximum speed limit while a transition demand (TD) is output, based on a current speed of the autonomous vehicle, and outputs the TD before a predetermined distance from the section where it is impossible to operate the autonomous driving and control a speed of the autonomous vehicle based on the maximum speed limit.

In an exemplary embodiment of the present disclosure, the autonomous driving control apparatus may further include a communication device provided in the autonomous vehicle to receive information related to a position of the autonomous vehicle and a storage configured for storing map information. The controller may be configured to determine whether there is the section where it is impossible to operate the autonomous driving in front of the autonomous vehicle, based on the information related to the position and the map information, during autonomous driving of the autonomous vehicle.

In an exemplary embodiment of the present disclosure, the autonomous driving control apparatus may further include a display device that displays the maximum speed limit during the autonomous driving. The controller may be configured to determine the maximum speed limit with regard to a minimum unit of the display device for the maximum speed limit.

In an exemplary embodiment of the present disclosure, the controller may be configured to determine the maximum speed limit as a speed which is not less than the current speed of the autonomous vehicle and considers the minimum unit.

In an exemplary embodiment of the present disclosure, the controller may be configured to determine whether the autonomous vehicle travels at a low speed based on a predetermined criterion, based on the current speed of the autonomous vehicle and may determine the maximum speed limit, based on a maximum speed of the autonomous vehicle in a predetermined time interval, when the controller concludes that the autonomous vehicle travels at the low speed.

In an exemplary embodiment of the present disclosure, the controller may be configured to determine whether the autonomous vehicle travels at a high speed based on a predetermined criterion, based on the current speed of the autonomous vehicle and may determine the maximum speed limit, based on a speed limit defined for a road where the autonomous vehicle is traveling, when the controller concludes that the autonomous vehicle travels at the high speed.

In an exemplary embodiment of the present disclosure, the controller may be configured to determine the maximum speed limit, based on a speed determined at a predetermined ratio of the defined speed limit, when the controller concludes that the autonomous vehicle travels at the high speed.

In an exemplary embodiment of the present disclosure, the controller may be configured to determine whether the autonomous vehicle travels at a high speed based on a predetermined criterion, based on the current speed of the autonomous vehicle and may determine the maximum speed limit, based on a predetermined speed set with regard to driving safety, when the controller concludes that the autonomous vehicle travels at the high speed.

In an exemplary embodiment of the present disclosure, the controller may be configured to determine the predetermined distance, based on a predetermined minimum risk maneuver (MRM) and the maximum speed limit.

In an exemplary embodiment of the present disclosure, the autonomous driving control apparatus may further include a sensor device provided in the autonomous vehicle to detect a surrounding object around the autonomous vehicle. The controller may be configured to determine whether there is the section where it is impossible to operate the autonomous driving in front of the autonomous driving route of the autonomous vehicle, based on information related to the surrounding object detected by the sensor device, during autonomous driving of the autonomous vehicle.

According to another aspect of the present disclosure, an autonomous driving control method may include determining, by a controller, whether there is a section where it is impossible to operate autonomous driving in front of an autonomous driving route of an autonomous vehicle, determining, by the controller, a maximum speed limit while a transition demand (TD) is output, based on a current speed of the autonomous vehicle, and outputting, by the controller, the TD before a predetermined distance from the section where it is impossible to operate the autonomous driving and controlling, by the controller, a speed of the autonomous vehicle based on the maximum speed limit.

In an exemplary embodiment of the present disclosure, the autonomous driving control method may further include receiving, by a communication device provided in the autonomous vehicle, information related to a position of the autonomous vehicle. The determining of whether there is the section where it is impossible to operate the autonomous driving in front of the autonomous driving route of the autonomous vehicle by the controller may include determining, by the controller, whether there is the section where it is impossible to operate the autonomous driving in front of the autonomous driving route of the autonomous vehicle, based on the information related to the position and map information stored in a storage, during autonomous driving of the autonomous vehicle.

In an exemplary embodiment of the present disclosure, the autonomous driving control method may further include displaying, by a display device, the maximum speed limit during the autonomous driving. The determining of the maximum speed limit by the controller may include determining, by the controller, the maximum speed limit with regard to a minimum unit of the display device for the maximum speed limit.

In an exemplary embodiment of the present disclosure, the determining of the maximum speed limit with regard to the minimum unit of the display device for the maximum speed limit by the controller may include determining, by the controller, the maximum speed limit as a speed which is not less than the current speed of the autonomous vehicle and considers the minimum unit.

In an exemplary embodiment of the present disclosure, the determining of the maximum speed limit by the controller may include determining, by the controller, whether the autonomous vehicle travels at a low speed based on a predetermined criterion, based on the current speed of the autonomous vehicle, and determining, by the controller, the maximum speed limit, based on a maximum speed of the autonomous vehicle in a predetermined time interval, when the controller concludes that the autonomous vehicle travels at the low speed.

In an exemplary embodiment of the present disclosure, the determining of the maximum speed limit by the controller may include determining, by the controller, whether the autonomous vehicle travels at a high speed based on a predetermined criterion, based on the current speed of the autonomous vehicle, and determining, by the controller, the maximum speed limit, according to a speed limit defined for a road where the autonomous vehicle is traveling, when the controller concludes that the autonomous vehicle travels at the high speed.

In an exemplary embodiment of the present disclosure, the determining of the maximum speed limit, based on the speed limit defined for the road where the autonomous vehicle is traveling by the controller may include determining, by the controller, the maximum speed limit, according to a speed determined at a predetermined ratio of the defined speed limit, when the controller concludes that the autonomous vehicle travels at the high speed.

In an exemplary embodiment of the present disclosure, the determining of the maximum speed limit by the controller may include determining, by the controller, whether the autonomous vehicle travels at a high speed based on a predetermined criterion, based on the current speed of the autonomous vehicle, and determining, by the controller, the maximum speed limit, based on a predetermined speed set with regard to driving safety, when the controller concludes that the autonomous vehicle travels at the high speed.

In an exemplary embodiment of the present disclosure, the autonomous driving control method may further include determining, by the controller, the predetermined distance, based on a predetermined minimum risk maneuver (MRM) and the maximum speed limit.

In an exemplary embodiment of the present disclosure, the autonomous driving control method may further include sensing, by a sensor device provided in the autonomous vehicle, a surrounding object around the autonomous vehicle. The determining of whether there is the section where it is impossible to operate the autonomous driving in front of the autonomous driving route of the autonomous vehicle by the controller may include determining, by the controller, whether there is the section where it is impossible to operate the autonomous driving in front of the autonomous driving route of the autonomous vehicle, based on information related to the surrounding object detected by the sensor device, during autonomous driving of the autonomous vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a table where an automation level of an autonomous vehicle is defined;

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 7.

FIG. 1 is a table where an automation level of an autonomous vehicle is defined.

An autonomous vehicle refers to a vehicle which recognizes a driving environment by itself to determine risk, is configured to control its driving route to minimize driving manipulation of a driver, and drives itself.

Finally, the autonomous vehicle refers to a vehicle configured for performing driving, steering, and parking without influence of persons and is focused on a vehicle where an autonomous driving technology, which is the core foundation of the autonomous vehicle,—that is, a capability of operating the vehicle without active control or monitoring of the driver—is developed to the highest degree.

Referring to FIG. 1, the driving environment is monitored by the driver in automation levels LEVELs 0 to 2. On the other hand, the driving environment is monitored by the automated driving system in automation levels LEVELs 3 to 5.

However, the concept of autonomous vehicles currently on the market may include an intermediate automation level to a fully autonomous vehicle and may correspond to a goal-oriented concept premised on the mass production and commercialization of fully autonomous vehicles.

An autonomous driving control apparatus and a method thereof according to an exemplary embodiment of the present disclosure are applicable to an autonomous vehicle corresponding to LEVEL 3 (conditional automation) in autonomous driving automation levels shown in FIG. 1, but are not necessarily limited thereto, and are applicable to an autonomous vehicle supporting a plurality of various automation levels.

An automation level of the autonomous vehicle may be classified as shown in a table of FIG. 1 based on the society of automotive engineers (SAE).

Figure 2:
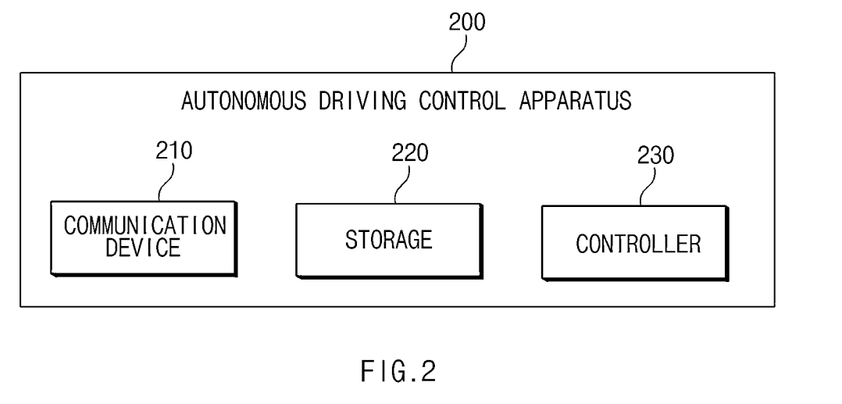
FIG. 2 is a block diagram illustrating an autonomous driving control apparatus according to an exemplary embodiment of the present disclosure.

FIG. 2 is a block diagram illustrating an autonomous driving control apparatus according to an exemplary embodiment of the present disclosure.

An autonomous driving control apparatus 200 according to an exemplary embodiment of the present disclosure may be implemented inside or outside a vehicle. In the instant case, the autonomous driving control apparatus 200 may be integrally configured with control units in the vehicle or may be implemented as a separate hardware device to be connected to the control units of the vehicle by a connection means.

As an exemplary embodiment of the present disclosure, the autonomous driving control apparatus 200 may be integrally configured with the vehicle or may be implemented as a separate configuration independent of the vehicle in a form of being installed/attached to the vehicle. Alternatively, a part of the autonomous driving control apparatus 200 may be integrally configured with the vehicle and the other may be implemented as a separate configuration independent of the vehicle in a form of being installed/attached to the vehicle.

Referring to FIG. 2, the autonomous driving control apparatus 200 may include a communication device 210, a storage 220, and a controller 230.

The communication device 210 may be provided in an autonomous vehicle to receive information related to a position of the autonomous vehicle.

As an exemplary embodiment of the present disclosure, the communication device 210 may identify a position of a vehicle (or a host vehicle) by a global navigation satellite system (GNSS). To the present end, the communication device 210 may embed a GNSS receiver and may identify a position of the host vehicle using a method for measuring a time when a radio wave emitted from a satellite arrives at the GNSS receiver.

As an exemplary embodiment of the present disclosure, the communication device 210 may deliver the received information related to the position of the autonomous vehicle to the controller 230.

The storage 220 may store map information.

As an exemplary embodiment of the present disclosure, the storage 220 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

As an exemplary embodiment of the present disclosure, the storage 220 may store map information received from a server, another vehicle, or the like through a communication module provided in the autonomous vehicle.

As an exemplary embodiment of the present disclosure, the storage 220 may store high definition map information around the autonomous vehicle, which is received from the server, the other vehicle, or the like through the communication module provided in the autonomous vehicle, based on a real-time position of the autonomous vehicle.

As an exemplary embodiment of the present disclosure, the storage 220 may be connected to the controller 230 to deliver the stored map information to the controller 230.

As an exemplary embodiment of the present disclosure, the map information stored in the storage 220 may include information related to a section where it is impossible to operate an autonomous driving function.

The controller 230 may perform the overall control so that respective components may normally perform their own functions. Such a controller 230 may be implemented in a form of hardware, may be implemented in a form of software, or may be implemented in a form of a combination thereof. The controller 230 may be implemented as, but not limited to, a microprocessor. Furthermore, the controller 230 may perform a variety of data processing, determination, and the like described below.

The controller 230 may include a memory which stores data or an algorithm required in a process of performing data processing and/or determination.

As an exemplary embodiment of the present disclosure, the memory which may be included in the controller 230 may include at least one type of storage medium, such as a flash memory type memory, a hard disk type memory, a micro type memory, a card type memory (e.g., an SD card or an XD card), a RAM, an SRAM, a ROM, a PROM, an EEPROM, an MRAM, a magnetic disk, or an optical disk.

A processor which may be included in the controller 230 may be an electric circuit which executes a command of software. For example, the processor included in the controller 230 may be an electronic control unit (ECU), a micro controller unit (MCU), or another sub-controller.

The controller 230 may determine whether there is a section where it is impossible to operate autonomous driving in front of an autonomous driving route of the autonomous vehicle, based on the information related to the position and the map information, during autonomous driving of the autonomous vehicle.

As an exemplary embodiment of the present disclosure, the controller 230 may determine whether there is a section where it is impossible to operate autonomous driving in front of a route with respect to the generated autonomous driving route, in a process of controlling autonomous driving of the autonomous vehicle.

As an exemplary embodiment of the present disclosure, the controller 230 may identify the section where it is impossible to operate the autonomous driving, by the map information stored in the storage 220.

As an exemplary embodiment of the present disclosure, the controller 230 may determine whether there is a section where it is impossible to operate autonomous driving within a predetermined specific distance in front of the driving route.

As an exemplary embodiment of the present disclosure, the section where it is impossible to operate the autonomous driving may refer to a section including an interchange (IC), a junction (JC), a tollgate (TG), a rest area, or the like on an autonomous driving route.

As an exemplary embodiment of the present disclosure, the section where it is impossible to operate the autonomous driving may be a section including a highway, a limited-access road, a vanishing lane, a reversible lane, a bus-only lane, or the like, based on an operational design domain (ODD) of the autonomous driving function.

In other words, the section where it is impossible to operate the autonomous driving may refer to a section which is not included in the ODD.

The controller 230 may determine a maximum speed limit while a transition demand (TD) is output, based on a current speed of the autonomous vehicle.

Although not illustrated, as an exemplary embodiment of the present disclosure, the autonomous driving control apparatus 200 may further include a display device which displays the maximum speed limit during autonomous driving.

As an exemplary embodiment of the present disclosure, the display device may be a cluster, an audio, video, navigation (AVN) display, or a head-up display of the autonomous vehicle.

There may be a minimum unit for the maximum speed limit, which corresponds to the display device.

As an exemplary embodiment of the present disclosure, the minimum unit of the display device may be a minimum unit configured for displaying the maximum speed limit.

For example, the minimum unit displaying the maximum speed limit may be determined as 1 km/h, 2 km/h, 5 km/h, 10 km/h, or the like.

As an exemplary embodiment of the present disclosure, the controller 230 may determine the maximum speed limit with regard to the minimum unit of the display device for the maximum speed limit.

As an exemplary embodiment of the present disclosure, the controller 230 may determine the maximum speed limit as an integer multiple of the minimum unit of the display device for the maximum speed limit.

For example, when the minimum unit is 5 km/h, the controller 230 may determine the maximum speed limit as 5 km/h, 10 km/h, 15 km/h, 20 km/h, 25 km/h, 30 km/h, or the like.

As an exemplary embodiment of the present disclosure, the controller 230 may determine the maximum speed limit as a speed which is not less than the current speed of the autonomous vehicle and considers the minimum unit.

For example, when the current speed of the autonomous vehicle is 52 km/h and when the minimum unit of the display device is 5 km/h, the controller 230 may determine a speed of 55 km/h, which is not less than the current speed of the autonomous vehicle and is a minimum speed among speeds which are an integer multiple of the minimum unit, as the maximum speed limit.

For another example, when the current speed of the autonomous vehicle is 60 km/h and when the minimum unit of the display device is 5 km/h, the controller 230 may determine a speed of 60 km/h, which is not less than the current speed of the autonomous vehicle and is a minimum speed among the speeds which are an integer multiple of the minimum unit, as the maximum speed limit.

As an exemplary embodiment of the present disclosure, the controller 230 may determine whether the autonomous vehicle travels at a low speed and at a high speed based on a predetermined criterion, based on the current speed of the autonomous vehicle.

As an exemplary embodiment of the present disclosure, the controller 230 may determine whether the autonomous vehicle travels at a low speed and at a high speed, with respect to a first reference speed for determining whether the autonomous vehicle travels at the low speed and a second reference speed for determining whether the autonomous vehicle travels at the high speed.

In detail, when the current speed of the autonomous vehicle is lower than the first reference speed, the controller 230 may determine that the autonomous vehicle travels at the low speed.

Furthermore, when the current speed of the autonomous vehicle is higher than the second reference speed, the controller 230 may determine that the autonomous vehicle travels at the high speed.

The first reference speed may be lower than the second reference speed. When the current speed of the autonomous vehicle is lower than the second reference speed and is higher than the first reference speed, the controller 230 may determine that the autonomous vehicle travels at a normal speed.

As an exemplary embodiment of the present disclosure, when it is determined that the autonomous vehicle travels at the low speed, the controller 230 may determine the maximum speed limit, based on a maximum speed of the autonomous vehicle in a specific time interval.

When the autonomous vehicle is traveling on a congestion section at a low speed, the controller 230 may determine the maximum speed limit as a speed which is the maximum speed in the congestion section or is not less than the maximum speed in the congestion section and considers the minimum unit.

Herein, the speed which considers the minimum unit may refer to a speed which is not less than the maximum speed in the congestion section and is a minimum speed among speeds which are an integer multiple of the minimum unit.

In other words, the speed which considers the minimum unit may refer to a speed obtained by rounding up a speed before considering the minimum unit based on the minimum unit.

Furthermore, as an exemplary embodiment of the present disclosure, the controller 230 may determine a specific time interval, prior to a time point when it is determined that the autonomous vehicle travels at the low speed, as a congestion section.

As an exemplary embodiment of the present disclosure, the controller 230 may determine a specific time interval, when the autonomous vehicle repeats driving and stop a predetermined specific number of times, as a congestion section.

For example, when the maximum speed of the autonomous vehicle is 30 km/h in the specific time interval and when the minimum unit of the display device is 5 km/h, the controller 230 may determine the maximum speed limit as 30 km/h.

As an exemplary embodiment of the present disclosure, when it is determined that the autonomous vehicle travels at the high speed, the controller 230 may determine the maximum speed limit, based on a speed limit defined for a road where the autonomous vehicle is traveling.

The speed limit defined for the road may refer to a limited maximum speed which is determined for safety in response to the road under road law or a maximum speed which is determined in response to the road for safety in the autonomous driving system itself.

As an exemplary embodiment of the present disclosure, when it is determined that the autonomous vehicle travels at the high speed, the controller 230 may determine the maximum speed limit, based on a speed determined at a predetermined ratio of the defined speed limit.

When the autonomous vehicle is traveling at the high speed, the controller 230 may determine the maximum speed limit as a speed which is determined at the specific ratio of the defined speed limit or a speed which is not less than the determined speed and considers the minimum unit.

The speed which considers the minimum unit may refer to a speed obtained by rounding up a speed before considering the minimum unit based on the minimum unit.

For example, when the defined speed limit is 60 km/h, when the predetermined specific ratio is 30%, and when the minimum unit of the display device is 5 km/h, the controller 230 may determine the maximum speed limit as 20 km/h.

As an exemplary embodiment of the present disclosure, when it is determined that the autonomous vehicle travels at the high speed, the controller 230 may determine the maximum speed limit, based on a specified speed set with regard to driving safety.

The controller 230 may set a specified speed in advance with regard to driving safety.

As an exemplary embodiment of the present disclosure, when it is determined that the autonomous vehicle travels at the high speed and when the autonomous vehicle travels on a road where there is no defined speed limit, the controller 230 may determine the maximum speed limit, based on the specified speed set with regard to the driving safety.

As an exemplary embodiment of the present disclosure, when the specified speed set with regard to the driving safety is 60 km/h and when the minimum unit of the display device is 5 km/h, the controller 230 may determine the maximum speed limit as 60 km/h.

As an exemplary embodiment of the present disclosure, the controller 230 may determine a specific distance, based on a predetermined minimum risk maneuver (MRM) and the maximum speed limit.

As an exemplary embodiment of the present disclosure, the controller 230 may perform autonomous driving at a maximum speed limit $v_0$ in a process where the predetermined MRM outputs a TD. When control authority does not transition to a user while the TD is output, the controller 230 may perform the MRM. When the autonomous vehicle has a strategy of performing autonomous driving at certain deceleration $a_1$ to stop, the controller 230 may determine a specific distance as $10*v_0+v_0^2/(2*a_1)$.

In other words, the controller 230 may determine the specific distance so that the autonomous driving may be stopped before entering a section where it is impossible to operate an autonomous driving function, based on a speed and acceleration where the autonomous vehicle performs autonomous driving, according to the autonomous driving strategy, in the process where the TD is output and the process where the MRM is performed.

The controller 230 may output a TD before a predetermined distance from the section where it is impossible to operate the autonomous driving and may control a speed of the autonomous vehicle based on the maximum speed limit.

As an exemplary embodiment of the present disclosure, while outputting the TD, the controller 230 may control a speed of the autonomous vehicle, based on the maximum speed limit, based on a predetermined autonomous driving strategy.

For example, while outputting the TD, the controller 230 may control a speed of the autonomous vehicle not to exceed the maximum speed limit.

Figure 3:
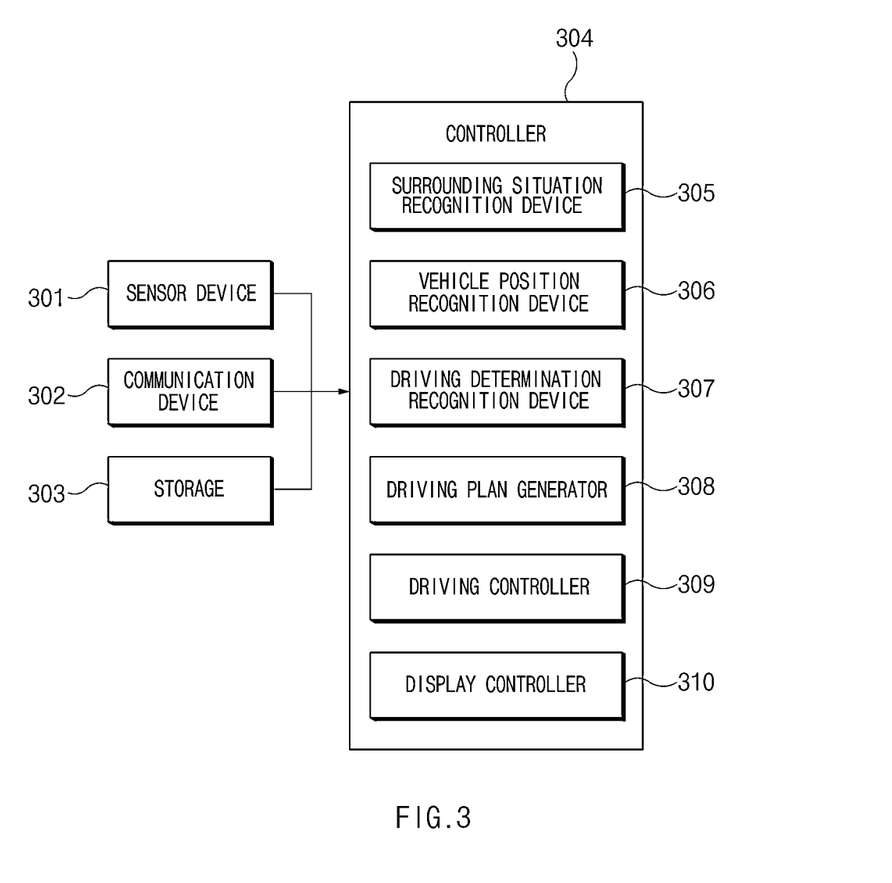
FIG. 3 is a block diagram illustrating a detailed configuration of an autonomous driving control apparatus according to an exemplary embodiment of the present disclosure.

FIG. 3 is a block diagram illustrating a detailed configuration of an autonomous driving control apparatus according to an exemplary embodiment of the present disclosure.

Referring to FIG. 3, a controller 304 may be connected to a sensor device 301, a communication device 302, and a storage 303 to receive various pieces of information from the sensor device 301, the communication device 302, and the storage 303.

As an exemplary embodiment of the present disclosure, the controller 304 may receive information related to the detected object around an autonomous vehicle from the sensor device 301.

As an exemplary embodiment of the present disclosure, the sensor device 301 may include at least one of a camera, a light detection and ranging (LiDAR), or a radar, which obtains information around the autonomous vehicle.

As an exemplary embodiment of the present disclosure, the controller 304 may receive information related to a current position of the autonomous vehicle, which is obtained by the communication device 302, from the communication device 302.

As an exemplary embodiment of the present disclosure, the communication device 302 may obtain information related to the current position of the autonomous vehicle by a GNSS.

As an exemplary embodiment of the present disclosure, the controller 304 may receive high definition map information around the autonomous vehicle from the storage 303.

As an exemplary embodiment of the present disclosure, the storage 303 may include a database which stores high definition map information.

The controller 304 may include a surrounding situation recognition device 305, a vehicle position recognition device 306, a driving determination recognition device 307, a driving plan generator 308, a driving controller 309, and a display controller 310.

As an exemplary embodiment of the present disclosure, the controller 304 may include a processor for performing calculation and/or data processing described below. The components 305 to 310 included in the controller 304 may be implemented by one or more processors. As an exemplary embodiment of the present disclosure, the controller 304 may include an ECU of the autonomous vehicle.

As an exemplary embodiment of the present disclosure, the surrounding situation recognition device 305 may recognize and process information related to a surrounding object around the autonomous vehicle, based on the information obtained by the sensor device 301.

As an exemplary embodiment of the present disclosure, the vehicle position recognition device 306 may recognize a current position of the autonomous vehicle, based on the information obtained through the communication device 302.

As an exemplary embodiment of the present disclosure, the vehicle position recognition device 306 may fuse the information obtained through the communication device 302 with the high definition map information obtained from the storage 303 and may determine a position of the autonomous vehicle on a map.

As an exemplary embodiment of the present disclosure, the driving determination recognition device 307 may determine information related to a current speed of the autonomous vehicle.

As an exemplary embodiment of the present disclosure, the driving plan generator 308 may plan autonomous driving of the autonomous vehicle based on a predetermined autonomous driving strategy.

As an exemplary embodiment of the present disclosure, the driving plan generator 308 may determine a value for driving, braking, and steering of the autonomous vehicle based on the autonomous driving strategy.

As an exemplary embodiment of the present disclosure, the driving controller 309 may control autonomous driving of the autonomous vehicle based on the autonomous driving strategy generated by the driving plan generator 308.

As an exemplary embodiment of the present disclosure, the driving controller 309 may control driving, braking, and steering of the autonomous vehicle.

As an exemplary embodiment of the present disclosure, the display controller 310 may control the displaying of the maximum speed limit in a process where a TD of the autonomous vehicle is output.

As an exemplary embodiment of the present disclosure, the display controller 310 may control the displaying of the maximum speed limit of the autonomous vehicle by a display device of the autonomous vehicle, which is not shown.

Figure 4:
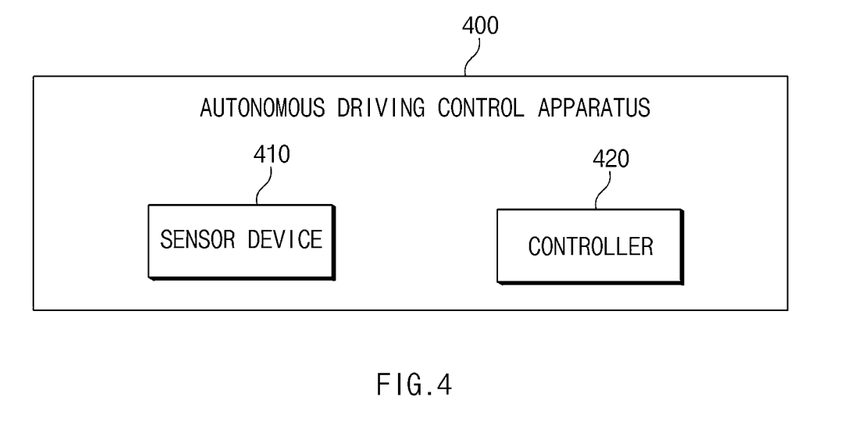
FIG. 4 is a block diagram illustrating an autonomous driving control apparatus according to another exemplary embodiment of the present disclosure.

FIG. 4 is a block diagram illustrating an autonomous driving control apparatus according to another exemplary embodiment of the present disclosure.

Referring to FIG. 4, an autonomous driving control apparatus 400 may include a sensor device 410 and a controller 420.

The sensor device 410 may be provided in an autonomous vehicle to detect a surrounding object around the autonomous vehicle.

The controller 420 may determine whether there is a section where it is impossible to operate autonomous driving in front of an autonomous driving route of the autonomous vehicle, based on information related to the surrounding object detected by the sensor device 410, during autonomous driving of the autonomous vehicle, may determine the maximum speed limit while a TD is output, based on a current speed of the autonomous vehicle, may output the TD before a specific distance from the section where it is impossible to operate the autonomous driving, and may control a speed of the autonomous vehicle based on the maximum speed limit.

Although not illustrated, as an exemplary embodiment of the present disclosure, the autonomous driving control apparatus 400 may further include a display device which displays the maximum speed limit during autonomous driving.

As an exemplary embodiment of the present disclosure, the controller 420 may determine the maximum speed limit with regard to a minimum unit of the display device for the maximum speed limit.

As an exemplary embodiment of the present disclosure, the controller 420 may determine the maximum speed limit as a speed which is not less than the current speed of the autonomous vehicle and considers the minimum unit.

As an exemplary embodiment of the present disclosure, the controller 420 may determine whether the autonomous vehicle travels at a low speed based on a predetermined criterion, based on the current speed of the autonomous vehicle. When it is determined that the autonomous vehicle travels at the low speed, the controller 420 may determine the maximum speed limit, based on a maximum speed of the autonomous vehicle in a specific time interval.

As an exemplary embodiment of the present disclosure, the controller 420 may determine whether the autonomous vehicle travels at a high speed based on the predetermined criterion, based on the current speed of the autonomous vehicle. When it is determined that the autonomous vehicle travels at the high speed, the controller 420 may determine the maximum speed limit, based on a speed limit defined for a road where the autonomous vehicle is traveling.

As an exemplary embodiment of the present disclosure, when it is determined that the autonomous vehicle travels at the high speed, the controller 420 may determine the maximum speed limit, based on a specified speed set with regard to driving safety.

As an exemplary embodiment of the present disclosure, the controller 420 may determine a specific distance, based on a predetermined minimum risk maneuver (MRM) and the maximum speed limit.

As an exemplary embodiment of the present disclosure, the controller 420 may determine the maximum speed limit to be the same as a process described for a controller 230 of FIG. 2.

Figure 5:
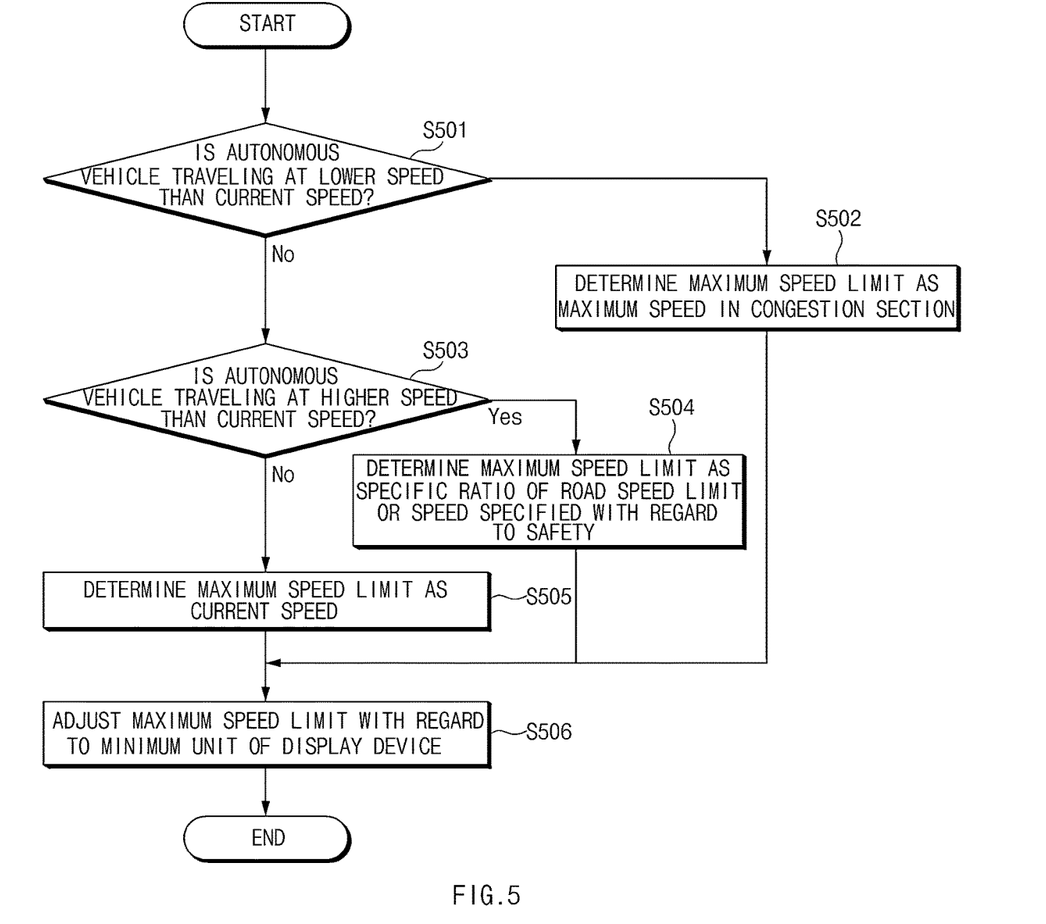
FIG. 5 is a flowchart illustrating an operation of an autonomous driving control apparatus according to an exemplary embodiment of the present disclosure.

FIG. 5 is a flowchart illustrating an operation of an autonomous driving control apparatus according to an exemplary embodiment of the present disclosure.

Hereinafter, it is assumed that an autonomous driving control apparatus 200 of FIG. 2 or an autonomous driving control apparatus 400 of FIG. 4 performs a process of FIG. 5. Furthermore, in a description of FIG. 5, an operation described as being performed by the autonomous driving control apparatus may be understood as being controlled by a controller 230 of the autonomous driving control apparatus 200 or a controller 420 of the autonomous driving control apparatus 400.

Referring to FIG. 5, in S501, the autonomous driving control apparatus may determine whether an autonomous vehicle is traveling at a lower speed than a current speed of the autonomous vehicle.

As an exemplary embodiment of the present disclosure, the autonomous driving control apparatus may determine that the autonomous vehicle is traveling at the low speed, when the current speed of the autonomous vehicle is lower than a first reference speed, and may determine that the autonomous vehicle is not traveling at the low speed, when the current speed of the autonomous vehicle is not lower than the first reference speed.

When it is determined that the autonomous vehicle is traveling at the lower speed than the current speed of the autonomous vehicle, in S502, the autonomous driving control apparatus may determine a maximum speed limit as a maximum speed in a congestion section.

When it is determined that the autonomous vehicle is not traveling at the lower speed than the current speed of the autonomous vehicle, in S503, the autonomous driving control apparatus may determine whether the autonomous vehicle is traveling at a greater speed than the current speed of the autonomous vehicle.

As an exemplary embodiment of the present disclosure, the autonomous driving control apparatus may determine that the autonomous vehicle is traveling at the high speed, when the current speed of the autonomous vehicle is higher than a second reference speed, and may determine that the autonomous vehicle is not traveling at the high speed, when the current speed of the autonomous vehicle is not higher than the second reference speed.

When it is determined that the autonomous vehicle is traveling at the higher speed than the current speed of the autonomous vehicle, in S504, the autonomous driving control apparatus may determine the maximum speed limit as a specific ratio of a road speed limit or a speed specified with regard to safety.

When it is determined that the autonomous vehicle is not traveling at the higher speed than the current speed of the autonomous vehicle, in S505, the autonomous driving control apparatus may determine the maximum speed limit as the current speed.

In S506, the autonomous driving control apparatus may adjust the maximum speed limit with regard to a minimum unit of a display device.

As an exemplary embodiment of the present disclosure, the autonomous driving control apparatus may round up the maximum speed limit determined in S502, S504, and S505 based on the minimum unit of the display device to adjust a final maximum speed limit.

Figure 6:
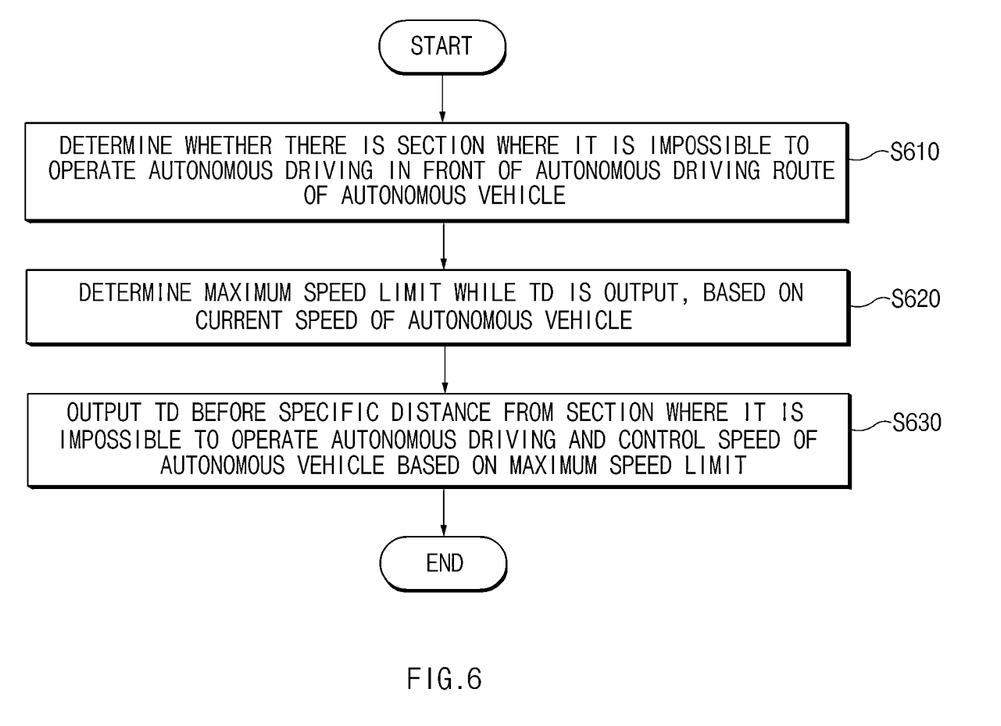
FIG. 6 is a flowchart illustrating an autonomous driving control method according to an exemplary embodiment of the present disclosure.

FIG. 6 is a flowchart illustrating an autonomous driving control method according to an exemplary embodiment of the present disclosure.

Referring to FIG. 6, the autonomous driving control method may include determining (S610) whether there is a section where it is impossible to operate autonomous driving in front of an autonomous driving route of an autonomous vehicle, determining (S620) a maximum speed limit while a transition demand (TD) is output, based on a current speed of the autonomous vehicle, and outputting (S630) the TD before a specific distance from the section where it is impossible to operate the autonomous driving and controlling a speed of the autonomous vehicle based on the maximum speed limit.

The determining (S610) of whether there is the section where it is impossible to operate the autonomous driving in front of the autonomous driving route of the autonomous vehicle may be performed by a controller.

Although not illustrated, as an exemplary embodiment of the present disclosure, the autonomous driving control method may further include receiving, by a communication device provided in the autonomous vehicle, information related to a position of the autonomous vehicle.

As an exemplary embodiment of the present disclosure, the determining (S610) of whether there is the section where it is impossible to operate the autonomous driving in front of the autonomous driving route of the autonomous vehicle may include determining, by the controller, whether there is the section where it is impossible to operate the autonomous driving in front of the autonomous driving route of the autonomous vehicle, based on the information related to the position and map information stored in a storage.

Although not illustrated, as an exemplary embodiment of the present disclosure, the autonomous driving control method may further include sensing, by a sensor device provided in the autonomous vehicle, a surrounding object around the autonomous vehicle.

As an exemplary embodiment of the present disclosure, the determining (S610) of whether there is the section where it is impossible to operate the autonomous driving in front of the autonomous driving route of the autonomous vehicle may include determining, by the controller, whether there is the section where it is impossible to operate the autonomous driving in front of the autonomous driving route of the autonomous vehicle, based on information related to the surrounding object detected by the sensor device, during autonomous driving of the autonomous vehicle.

The determining (S620) of the maximum speed limit while the TD is output, based on the current speed of the autonomous vehicle, may be performed by the controller.

Although not illustrated, as an exemplary embodiment of the present disclosure, the autonomous driving control method may further include displaying, by a display device, the maximum speed limit during autonomous driving.

As an exemplary embodiment of the present disclosure, the determining (S620) of the maximum speed limit while the TD is output, based on the current speed of the autonomous vehicle, may include determining, by the controller, the maximum speed limit with regard to a minimum unit of the display device for the maximum speed limit.

As an exemplary embodiment of the present disclosure, the determining (S620) of the maximum speed limit while the TD is output, based on the current speed of the autonomous vehicle, may include determining, by the controller, the maximum speed limit as a speed which is not less than the current speed of the autonomous vehicle and considers the minimum unit.

As an exemplary embodiment of the present disclosure, the determining (S620) of the maximum speed limit while the TD is output, based on the current speed of the autonomous vehicle, may include determining, by the controller, whether the autonomous vehicle travels at a low speed based on a predetermined criterion, based on the current speed of the autonomous vehicle and determining, by the controller, the maximum speed limit, based on a maximum speed of the autonomous vehicle in a specific time interval, when it is determined that the autonomous vehicle travels at the low speed.

As an exemplary embodiment of the present disclosure, the determining (S620) of the maximum speed limit while the TD is output, based on the current speed of the autonomous vehicle, may include determining, by the controller, whether the autonomous vehicle travels at a high speed based on the predetermined criterion, based on the current speed of the autonomous vehicle, and determining, by the controller, the maximum speed limit, based on a speed limit defined for a road where the autonomous vehicle is traveling, when it is determined that the autonomous vehicle travels at the high speed.

As an exemplary embodiment of the present disclosure, the determining of the maximum speed limit, based on the speed limit defined for the road where the autonomous vehicle is traveling, by the controller may include determining, by the controller, the maximum speed limit, based on a speed determined at a specific ratio of the defined speed limit, when it is determined that the autonomous vehicle travels at the high speed.

As an exemplary embodiment of the present disclosure, the determining (S620) of the maximum speed limit while the TD is output, based on the current speed of the autonomous vehicle, may include determining, by the controller, the maximum speed limit, based on a specified speed set with regard to driving safety, when it is determined that the autonomous vehicle travels at the high speed.

The outputting (S630) of the TD before the specific distance from the section where it is impossible to operate the autonomous driving and the controlling of the speed of the autonomous vehicle based on the maximum speed limit may be performed by the controller.

Although not illustrated, as an exemplary embodiment of the present disclosure, the autonomous driving control method may further include determining, by the controller, the specific distance, based on a predetermined minimum risk maneuver (MRM) and the maximum speed limit.

Figure 7:
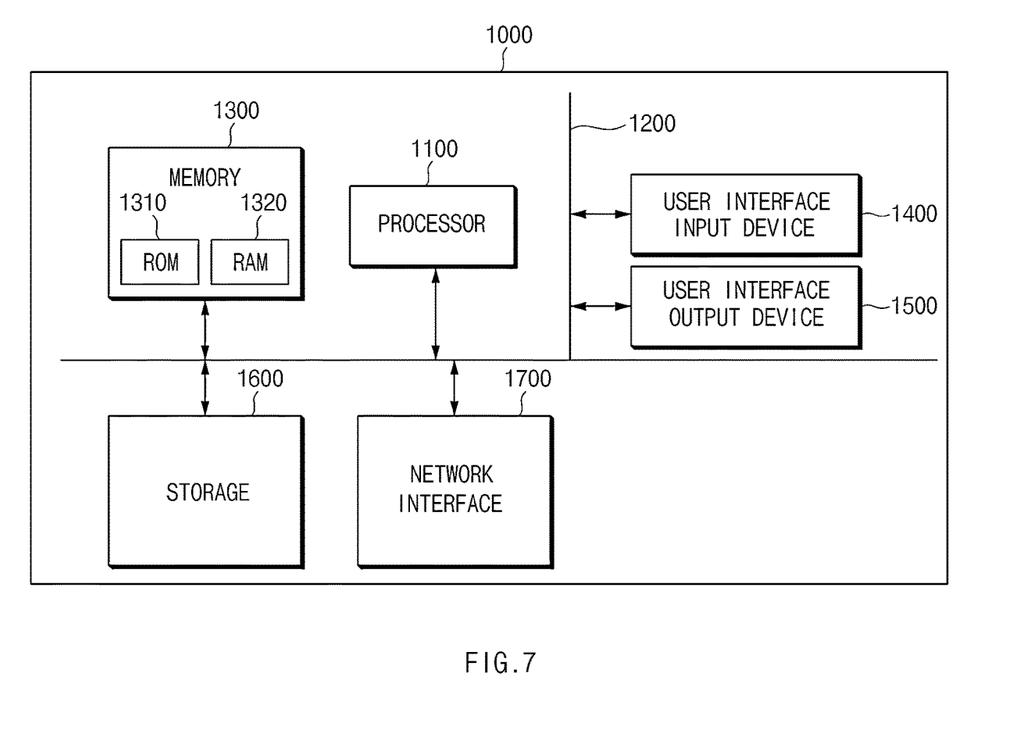
FIG. 7 is a block diagram illustrating a computing system according to an exemplary embodiment of the present disclosure.

FIG. 7 is a block diagram illustrating a computing system according to an exemplary embodiment of the present disclosure.

Referring to FIG. 7, a determining system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be provided of effects of the autonomous driving control apparatus and the method thereof according to an exemplary embodiment of the present disclosure.

According to at least one of embodiments of the present disclosure, the apparatus and the method thereof may be provided to control autonomous driving in a transition demand (TD) process during the autonomous driving.

Furthermore, according to at least one of embodiments of the present disclosure, the autonomous driving control apparatus and the method thereof may be provided to enhance a problem in which a TD is initiated from a too long distance to a section where it is impossible to operate autonomous driving.

Furthermore, according to at least one of embodiments of the present disclosure, the autonomous driving control apparatus and the method thereof may be provided to enhance satisfaction of a user who utilizes an autonomous driving function in a TD process.

Furthermore, according to at least one of embodiments of the present disclosure, the autonomous driving control apparatus and the method thereof may be provided for stability of an autonomous driving function in a TD process.

Furthermore, according to at least one of embodiments of the present disclosure, the autonomous driving control apparatus and the method thereof may be provided to perform a TD with regard to a surrounding situation in a TD process.

Furthermore, various effects ascertained directly or indirectly through the present disclosure may be provided.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control apparatus, comprising:
    a controller configured to determine whether there is a section where it is impossible to operate autonomous driving in front of an autonomous driving route of an autonomous vehicle, determine a maximum speed limit while a transition demand (TD) is output, based on a current speed of the autonomous vehicle, and output the TD before a predetermined distance from the section where it is impossible to operate the autonomous driving and control a speed of the autonomous vehicle based on the maximum speed limit;
    a communication device configured to receive information related to a position of the autonomous vehicle;
    a storage configured for storing map information; and
    a sensor device configured to detect surrounding objects around the autonomous vehicle,
    wherein the controller further configured to determine whether there is the section where it is impossible to operate the autonomous driving in front of the autonomous driving route of the autonomous vehicle, based on at least one of the information about the position, the map information, or information about the surrounding objects during the autonomous driving of the autonomous vehicle.

2. The autonomous driving control apparatus of claim 1, further including:
    a display device configured to display the maximum speed limit during the autonomous driving of the autonomous vehicle,
    wherein the controller is further configured to determine the maximum speed limit with regard to a minimum unit of the display device for the maximum speed limit.

3. The autonomous driving control apparatus of claim 2, wherein the controller is further configured to determine the maximum speed limit as a speed which is not less than the current speed of the autonomous vehicle and considers the minimum unit.

4. The autonomous driving control apparatus of claim 1, wherein the controller is further configured to conclude that the autonomous vehicle travels at a low speed when the current speed of the autonomous vehicle is lower than a first reference speed set in advance and to determine the maximum speed limit, based on a maximum speed of the autonomous vehicle in a predetermined time interval, when the controller concludes that the autonomous vehicle travels at the low speed.

5. The autonomous driving control apparatus of claim 1, wherein the controller is further configured to conclude that the autonomous vehicle travels at a high speed when the current speed of the autonomous vehicle is higher that a second reference speed set in advance and to determine the maximum speed limit, based on a speed limit defined for a road where the autonomous vehicle is traveling, when the controller concludes that the autonomous vehicle travels at the high speed.

6. The autonomous driving control apparatus of claim 5, wherein the controller is further configured to determine the maximum speed limit, based on a speed determined at a predetermined ratio of the defined speed limit, when the controller concludes that the autonomous vehicle travels at the high speed.

7. The autonomous driving control apparatus of claim 1, wherein the controller is further configured to determine whether the autonomous vehicle travels at a speed higher than a reference speed based on a predetermined criterion, based on the current speed of the autonomous vehicle and to determine the maximum speed limit, based on a predetermined speed set with regard to driving safety, when the controller concludes that the autonomous vehicle travels at the speed higher than a reference speed.

8. The autonomous driving control apparatus of claim 1, wherein the controller is further configured to determine the predetermined distance, based on a predetermined minimum risk maneuver (MRM) and the maximum speed limit.

9. The autonomous driving control apparatus of claim 1, further including:
    the sensor device provided in the autonomous vehicle and configured to detect the surrounding objects around the autonomous vehicle,
    wherein the controller is further configured to determine whether there is the section where it is impossible to operate the autonomous driving in front of the autonomous driving route of the autonomous vehicle, based on the information related to the surrounding objects detected by the sensor device, during the autonomous driving of the autonomous vehicle.

10. An autonomous driving control method, comprising:
receiving, by a controller, information related to a position of an autonomous vehicle from a communication device;
storing, by the controller, map information in a storage;
detecting, by the controller, a surrounding object around the autonomous vehicle by a sensor device;
determining, by the controller, whether there is a section where it is impossible to operate autonomous driving in front of an autonomous driving route of the autonomous vehicle, based on at least one of the information about the position, the map information, or information about the surrounding objects during the autonomous driving of the autonomous vehicle;
determining, by the controller, a maximum speed limit while a transition demand (TD) is output, based on a current speed of the autonomous vehicle; and
outputting, by the controller, the TD before a predetermined distance from the section where it is impossible to operate the autonomous driving and controlling, by the controller, a speed of the autonomous vehicle based on the maximum speed limit.

11. The autonomous driving control method of claim 10, further including:
displaying, by a display device, the maximum speed limit during the autonomous driving of the autonomous vehicle,
wherein the determining of the maximum speed limit by the controller includes:
determining, by the controller, the maximum speed limit with regard to a minimum unit of the display device for the maximum speed limit.

12. The autonomous driving control method of claim 11, wherein the determining of the maximum speed limit with regard to the minimum unit of the display device for the maximum speed limit by the controller includes:
determining, by the controller, the maximum speed limit as a speed which is not less than the current speed of the autonomous vehicle and considers the minimum unit.

13. The autonomous driving control method of claim 10, wherein the determining of the maximum speed limit by the controller includes:
determining, by the controller, that the autonomous vehicle travels at a low speed if the current speed of the autonomous vehicle is lower than a first reference speed set in advance; and
determining, by the controller, the maximum speed limit, based on a maximum speed of the autonomous vehicle in a predetermined time interval, when the controller concludes that the autonomous vehicle travels at the low speed.

14. The autonomous driving control method of claim 10, wherein the determining of the maximum speed limit by the controller includes:
determining, by the controller, that the autonomous vehicle travels at a high speed if the current speed of the autonomous vehicle is higher that a second reference speed set in advance; and
determining, by the controller, the maximum speed limit, based on a speed limit defined for a road where the autonomous vehicle is traveling, when the controller concludes that the autonomous vehicle travels at the high speed.

15. The autonomous driving control method of claim 14, wherein the determining of the maximum speed limit, based on the speed limit defined for the road where the autonomous vehicle is traveling by the controller includes:
determining, by the controller, the maximum speed limit, based on a speed determined at a predetermined ratio of the defined speed limit, when the controller concludes that the autonomous vehicle travels at the high speed.

16. The autonomous driving control method of claim 10, wherein the determining of the maximum speed limit by the controller includes:
determining, by the controller, whether the autonomous vehicle travels at a speed higher than a reference speed based on a predetermined criterion, based on the current speed of the autonomous vehicle; and
determining, by the controller, the maximum speed limit, based on a predetermined speed set with regard to driving safety, when the controller concludes that the autonomous vehicle travels at the speed higher than the reference speed.

17. The autonomous driving control method of claim 10, further including:
determining, by the controller, the predetermined distance, based on a predetermined minimum risk maneuver (MRM) and the maximum speed limit.

18. The autonomous driving control method of claim 10, further including:
sensing, by the sensor device provided in the autonomous vehicle, the surrounding object around the autonomous vehicle,
wherein the determining of whether there is the section where it is impossible to operate the autonomous driving in front of the autonomous driving route of the autonomous vehicle by the controller includes:
determining, by the controller, whether there is the section where it is impossible to operate the autonomous driving in front of the autonomous driving route of the autonomous vehicle, based on the information related to the surrounding object detected by the sensor device, during the autonomous driving of the autonomous vehicle.

* * * * *